United States Patent
Takada et al.

(10) Patent No.: US 10,703,908 B2
(45) Date of Patent: Jul. 7, 2020

(54) ORGANOPOLYSILOXANE EMULSION COMPOSITION AND RESIN COMPOSITION

(71) Applicant: SHIN-ETSU CHEMICAL CO., LTD., Tokyo (JP)

(72) Inventors: Yuko Takada, Annaka (JP); Shunji Aoki, Annaka (JP)

(73) Assignee: SHIN-ETSU CHEMICAL CO., LTD., Tokyo (JP)

(*) Notice: Subject to any disclaimer, the term of this patent is extended or adjusted under 35 U.S.C. 154(b) by 61 days.

(21) Appl. No.: 16/069,563

(22) PCT Filed: Jan. 6, 2017

(86) PCT No.: PCT/JP2017/000213
§ 371 (c)(1),
(2) Date: Jul. 12, 2018

(87) PCT Pub. No.: WO2017/122581
PCT Pub. Date: Jul. 20, 2017

(65) Prior Publication Data
US 2019/0023850 A1    Jan. 24, 2019

(30) Foreign Application Priority Data
Jan. 15, 2016  (JP) ................ 2016-005912

(51) Int. Cl.
| | | |
|---|---|---|
| *C08L 83/12* | (2006.01) | |
| *C08L 83/04* | (2006.01) | |
| *C08G 77/46* | (2006.01) | |
| *C08J 3/07* | (2006.01) | |
| *C08L 83/06* | (2006.01) | |
| *C08G 65/336* | (2006.01) | |
| *C08G 77/38* | (2006.01) | |

(52) U.S. Cl.
CPC .............. *C08L 83/04* (2013.01); *C08G 77/46* (2013.01); *C08J 3/07* (2013.01); *C08L 83/06* (2013.01); *C08L 83/12* (2013.01); *C08G 65/336* (2013.01); *C08G 77/38* (2013.01)

(58) Field of Classification Search
None
See application file for complete search history.

(56) References Cited

U.S. PATENT DOCUMENTS

| | | |
|---|---|---|
| 5,770,112 A | 6/1998 | Omura et al. |
| 6,139,851 A | 10/2000 | Omura et al. |
| 6,372,830 B1 * | 4/2002 | Sato ............... A61K 8/06 424/401 |
| 2011/0021688 A1 | 1/2011 | Herzig et al. |
| 2017/0204266 A1* | 7/2017 | Kennedy ............ C09D 175/00 |

FOREIGN PATENT DOCUMENTS

| | | | |
|---|---|---|---|
| EP | 1 148 100 A2 | 10/2001 | |
| JP | 64-63031 A | 3/1989 | |
| JP | 1-210028 A | 8/1989 | |
| JP | 07-330630 | * | 12/1995 |
| JP | 7-330630 A | 12/1995 | |
| JP | 10-324616 A | 12/1998 | |
| JP | 3023250 B2 | 3/2000 | |
| JP | 3417567 B2 | 6/2003 | |
| JP | 3633820 B2 | 3/2005 | |
| JP | 2007-314919 A | 12/2007 | |
| JP | 5186079 B2 | 4/2013 | |
| JP | 2014-80713 A | 5/2014 | |
| JP | 5646355 B2 | 12/2014 | |
| WO | WO 2016/111225 A1 | 7/2016 | |
| WO | WO 2018/029966 | * | 2/2018 |

OTHER PUBLICATIONS

International Search Report for PCT/JP2017/000213 dated Feb. 7, 2017.
Written Opinion of the International Searching Authority for PCT/JP2017/000213 (PCT/ISA/237) dated Feb. 7, 2017.
Extended European Search Report for European Application No. 17738336.1, dated Jul. 16, 2019.

* cited by examiner

*Primary Examiner* — Marc S Zimmer
(74) *Attorney, Agent, or Firm* — Birch, Stewart, Kolasch & Birch, LLP

(57) ABSTRACT

An organopolysiloxane emulsion composition which contains a polyoxyalkylene-modified organopolysiloxane compound represented by formula (1) as an emulsifying agent or as an emulsifying assistant.

$$(LR_2SiO_{1/2})_a(R_3SiO_{1/2})_b(R_2SiO_{2/2})_c(RSiO_{3/2})_d(SiO_{4/2})_e \quad (1)$$

(In the formula, L represents a polyoxyalkylene group represented by formula (2); R represents a hydrogen atom, a hydroxy group, an alkyl group, an aryl group, an aralkyl group or an alkoxy group; a represents a number of 2-4; b represents a number of 0-2; c represents a number of 50-1,000; and each of d and e represents 0 or 1.)

$$-H_2C-CH_2-(CH_2)_r-O-(EO)_s-(AO)_t-R^1 \quad (2)$$

(In formula (2), EO represents an oxyethylene group; AO represents a linear or branched oxyalkylene group having 3-10 carbon atoms; $R^1$ represents an alkyl group, a hydrogen atom, a carboxy group, an acyl group or a phenyl group; r represents a number of 0-10; s represents a number of 1-100, t represents a number of 0-150; and (s+t) represents a number of 15 or more.)

18 Claims, No Drawings

ORGANOPOLYSILOXANE EMULSION COMPOSITION AND RESIN COMPOSITION

TECHNICAL FIELD

The present invention relates to an organopolysiloxane emulsion composition formulated with a polyoxyalkylene-modified organopolysiloxane compound as an emulsifying agent or a co-emulsifying agent, and to a resin composition containing such an emulsion composition.

BACKGROUND ART

Resin compositions of urethane resins, acrylic resins and the like are divided into solvent-based systems which use organic solvents to provide good film formability and water-based systems which, due to concerns over environmental contamination, do not include organic solvents. Owing to concerns over organic solvents evaporating in the drying step and adversely affecting worker health, solvent-based resin compositions most often use high-boiling organic solvents such as N,N'-dimethylformamide (DMF).

Artificial leathers and synthetic leathers that have been internal addition treated or surface treated with a solvent-based or water-based resin composition are used in such applications as automobile seats, furniture and apparel, and are desired to have gloss, slippage and leveling ability. Highly polymerized polydimethylsiloxanes are included so as to satisfy the need for slippage and wear resistance. In order to be able to include polydimethylsiloxanes both in solvent-based resin compositions and in water-based resin compositions, emulsification or the like must be carried out to enable the polydimethylsiloxane to disperse both in DMF and in water. However, when a polydimethylsiloxane emulsion composition obtained by emulsification with a nonionic surfactant, an anionic surfactant or a cationic surfactant is included in a DMF or other solvent-based resin composition, it does not uniformly disperse, as a result of which an emulsified state cannot be maintained and the polydimethylsiloxane separates out. Accordingly, there has existed a desire for the development of highly polymerized polydimethylsiloxane emulsion compositions that are capable of dispersing in both solvents such as DMF and in water.

Emulsion compositions that are stable to solvents have hitherto been developed. Patents relating to emulsion compositions which include polar solvents such as alcohols are described below.

Patent Document 1: JP No. 3023250 discloses an oil-in-water type emulsion cosmetic containing a cyclic silicone, a surfactant, a highly polymerized pendant polyoxyalkylene-modified silicone, ethanol and titanium oxide. A polyoxyalkylene-modified silicone in which silicone side chains are modified with short-chain polyoxyalkylene groups is used, which differs in structure from that of the polyoxyalkylene-modified organopolysiloxane compound included in the emulsion composition of the present invention. Also, an emulsion composition of a cyclic silicone is mentioned, and so the object of this art is not the emulsification of a highly polymerized organopolysiloxane.

Patent Document 2: JP No. 3417567 discloses an emulsion of an oil and a lower alcohol obtained with a pendant polyoxyalkylene-modified silicone. By using a pendant polyoxyalkylene-modified silicone as the emulsifying agent, the emulsion is stable even when it includes a high concentration of alcohol. This art uses a polyoxyalkylene-modified silicone having silicone side chains modified with short-chain polyoxyalkylene groups, which silicone differs in structure from the polyoxyalkylene-modified organopolysiloxane compound included in the emulsion composition of the present invention. Also, emulsion compositions in which the base oil is a liquid paraffin, a higher alcohol, a silicone oil or the like are given as examples, and so the object of this art is not the emulsification of highly polymerized organopolysiloxanes.

Patent Document 3: JP No. 3633820 discloses an emulsion which is intended for use as a cosmetic and includes a polysiloxane obtained from a polyoxyalkylene-modified silicone that is modified at both ends, a powder treated for water repellency, and ethanol. Because the emulsion composition of the present invention does not include a treated powder, the compounding ingredients are different. Also, emulsion compositions containing cyclic siloxanes and 6 cs low-viscosity polysiloxanes as the base oil are mentioned as examples, and so the object of this art is not the emulsification of highly polymerized organopolysiloxanes.

Patent Document 4: JP No. 5646355 discloses an emulsion which is intended for use as a cosmetic and includes a polydimethylsiloxane, a polyether-modified silicone and a lower alcohol. The polydimethylsiloxane has a viscosity of from 20 to 10,000 mm$^2$/s, which differs from the viscosity of the organopolysiloxane of the present invention.

In addition, patents relating to resin compositions obtained by formulating urethane resin compositions for artificial leather or synthetic resin with polydimethylsiloxanes are described.

Patent Document 5: JP-A 2014-80713 discloses the formulation of a solid dimethylsilicone in a urethane resin, and the use of the resulting composition as a surface treatment agent for synthetic resins. A non-emulsified dimethylsilicone is used, and appears to be incapable of being blended into a water-based resin composition. Accordingly, this does not disperse in solvent-based or water-based resin compositions, and so this art differs from the emulsion composition of the present invention.

Patent Example 6: JP-A 2007-314919 discloses a water-based resin composition which includes, together with a urethane resin: a polyisocyanate crosslinking agent, a silicone compound and a filler. The silicone compound is a polyether-modified silicone. Hence, this art differs from the emulsion composition of the present invention which is obtained by emulsifying a highly polymerized organopolysiloxane.

In addition, a patent relating to a paint that includes a polydimethylsiloxane and a polyalkylene-modified organopolysiloxane is described.

Patent Example 7: JP 5186079 discloses a paint additive which is a mixture of a silicone modified at one end with a polyether and a nonionic surfactant, which can persistently impart a slight degree of hydrophilicity to the surface of a coating film, and the purpose of which is to exhibit an ability to prevent fouling by aquatic organisms over an extended period of time. The present invention was developed with the object of imparting slippage and wear resistance to synthetic resins, artificial resins and the like used in automobiles and bags. Hence, the art described here differs from the present invention both in its makeup and in the intended use.

PRIOR ART DOCUMENTS

Patent Documents

Patent Document 1: JP 3023250
Patent Document 2: JP 3417567

Patent Document 3: JP 3633820
Patent Document 4: JP 5646355
Patent Document 5: JP-A 2014-80713
Patent Document 6: JP-A 2007-314919
Patent Document 7: JP 5186079

SUMMARY OF INVENTION

Technical Problem

It is therefore an object of the present invention to provide an organopolysiloxane emulsion composition in which a highly polymerized organopolysiloxane capable of dispersing in both solvents such as DMF and in water is emulsified. Another object is to provide a resin composition formulated with the organopolysiloxane emulsion composition, which resin composition is useful as a surface treatment agent or an internally added treatment agent that imparts slippage and wear resistance to synthetic resins and artificial resins used in automobiles and bags.

Solution to Problem

The inventors have conducted extensive investigations in order to achieve the above objects. As a result, they have discovered that a highly polymerized organopolysiloxane can be easily emulsified by using a polyoxyalkylene-modified organopolysiloxane compound of a specific structure as an emulsifying agent or a co-emulsifying agent. They have also found that, because the resulting organopolysiloxane emulsion composition has an excellent solvent resistance to polar solvents such as DMF and disperses in water as well, whether included in a resin composition that is solvent-based or water-based, it is able to impart slippage and wear resistance. These discoveries ultimately led to the present invention.

Accordingly, this invention provides the following organopolysiloxane emulsion composition and resin composition.

[1] An organopolysiloxane emulsion composition comprising:
(A) from 1 to 50 parts by weight of a polyoxyalkylene-modified organopolysiloxane compound of general formula (1) below

[Chem. 1]

$$(LR_2SiO_{1/2})_a(R_3SiO_{1/2})_b(R_2SiO_{2/2})_c(RSiO_{3/2})_d \\ (SiO_{4/2})_e \qquad (1)$$

[wherein L is a polyoxyalkylene group of general formula (2) below

[Chem. 2]

$$-H_2C-CH_2-(CH_2)_r-O-(EO)_s-(AO)_t-R^1 \qquad (2)$$

(EO representing an oxyethylene group, AO representing a linear or branched oxyalkylene group of 3 to 10 carbon atoms, $R^1$ being a linear or branched, substituted or unsubstituted alkyl group of 1 to 10 carbon atoms, a hydrogen atom, a carboxyl group, an acyl group of 2 to 10 carbon atoms or a phenyl group; the subscript r being an integer from 0 to 10, the subscript s being an integer from 1 to 100, the subscript t being an integer from 0 to 150, and the sum s+t being 15 or more); each R, which may be the same or different, is a hydrogen atom, a hydroxyl group, a linear or branched, substituted or unsubstituted alkyl group of 1 to 20 carbon atoms, an aryl group of 6 to 20 carbon atoms, an aralkyl group of 7 to 20 carbon atoms or an alkoxy group of 1 to 20 carbon atoms; the subscript a is an integer from 2 to 4; the subscript b is an integer from 0 to 2; the subscript c is an integer from 50 to 1,000; the subscript d is 0 or 1; and the subscript e is 0 or 1];

(B) from 0 to 50 parts by weight of a surfactant;
(C) 100 parts by weight of an organopolysiloxane having a viscosity at 25° C. of at least 15,000 mPa·s; and
(D) from 0 to 10,000 parts by weight of water.

[2] The organopolysiloxane emulsion composition of [1], wherein the polyoxyalkylene-modified organopolysiloxane compound (A) is a polyoxyalkylene-modified organopolysiloxane compound having a polyoxyalkylene group of general formula (3) below on both ends

[Chem. 3]

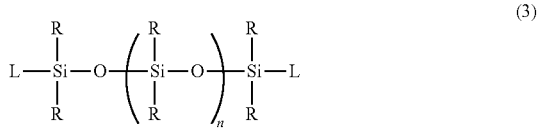

(3)

(wherein L and R are as defined above, and the subscript n is an integer from 50 to 1,000).

[3] The organopolysiloxane emulsion composition of [1] or [2], wherein the organopolysiloxane (C) has a viscosity at 25° C. of at least 500,000 mPa·s.

[4] The organopolysiloxane emulsion composition of any of [1] to [3], wherein the emulsion has an average particle size of not more than 20 μm.

[5] The organopolysiloxane emulsion composition of any of [1] to [4], wherein the organopolysiloxane (C) is a dimethylpolysiloxane, a phenyl-modified polysiloxane, a hydroxy-modified polysiloxane, or a mixture of these.

[6] A resin composition comprising a resin selected from the group consisting of urethane resins, epoxy resins, phenolic resins, melamine resins, urea resins, alkyd resins, polyimide resins, polyethylene, polypropylene, polyvinyl chloride, polystyrene, polyvinyl acetate, tetrafluoroethylene, acrylonitrile-butadiene-styrene resins, acrylonitrile-styrene resins and acrylic resins; and the organopolysiloxane emulsion composition of any of [1] to [5].

Advantageous Effects of Invention

The organopolysiloxane emulsion composition of the invention is capable of dispersing both in water and in polar solvents such as DMF. When the organopolysiloxane emulsion composition is included in a solvent-based or water-based resin composition and used as a surface treatment agent or internally added treatment agent for synthetic leather or artificial leather, slippage can be imparted without a loss of leveling properties and glossiness.

DESCRIPTION OF EMBODIMENTS

The invention is described in detail below.
[Organopolysiloxane Emulsion Composition]

The organopolysiloxane emulsion composition of the invention is characterized by including:
(A) from 1 to 50 parts by weight of a polyoxyalkylene-modified organopolysiloxane compound of general formula (1) below,
(B) from 0 to 50 parts by weight of a surfactant,
(C) 100 parts by weight of an organopolysiloxane having a viscosity at 25° C. of at least 15,000 mPa·s, and
(D) from 0 to 10,000 parts by weight of water.

[(A) Polyoxyalkylene-Modified Organopolysiloxane Compound]

The polyoxyalkylene-modified organopolysiloxane compound serving as component (A) is a compound of general formula (1) below.

[Chem. 4]

$$(LR_2SiO_{1/2})_a(R_3SiO_{1/2})_b(R_2SiO_{2/2})_c(RSiO_{3/2})_d(SiO_{4/2})_e \quad (1)$$

Here, L is a polyoxyalkylene group of general formula (2) below

[Chem. 5]

$$—H_2C—CH_2—(CH_2)_r—O-(EO)_s\text{-}(AO)_t—R^1 \quad (2)$$

(wherein EO represents an oxyethylene group; AO represents a linear or branched oxyalkylene group of 3 to 10 carbon atoms; $R^1$ is a linear or branched, substituted or unsubstituted alkyl group of 1 to 10 carbon atoms, a hydrogen atom, a carboxyl group, an acyl group of 2 to 10 carbon atoms or a phenyl group; the subscript r is an integer from 0 to 10; the subscript s is an integer from 1 to 100; the subscript t is an integer from 0 to 150; and the sum s+t is 15 or more). Each R, which may be the same or different, is a hydrogen atom, a hydroxyl group, a linear or branched, substituted or unsubstituted alkyl group of 1 to 20 carbon atoms, an aryl group of 6 to 20 carbon atoms, an aralkyl group of 7 to 20 carbon atoms or an alkoxy group of 1 to 20 carbon atoms; the subscript a is an integer from 2 to 4; the subscript b is an integer from 0 to 2; the subscript c is an integer from 50 to 1,000; the subscript d is 0 or 1; and the subscript e is 0 or 1.

By having the polyoxyalkylene-modified organopolysiloxane compound of component (A) serve as a co-emulsifying agent or emulsifying agent for the subsequently described organopolysiloxane (C), a highly polymerized organopolysiloxane can be easily emulsified and the particle size of the emulsion can be made small. In particular, an organopolysiloxane (C) having a viscosity of 20,000,000 mPa·s or more has difficulty emulsifying with the surfactant (B) alone, but can readily emulsify with the inclusion of the polyoxyalkylene-modified organopolysiloxane compound (A). By including a polyoxyalkylene-modified organopolysiloxane compound (A), the organopolysiloxane emulsion composition of the invention manifests solvent resistance and salt resistance.

In formula (1) above, each R, which may be the same or different, is a hydrogen atom, a hydroxyl group, a linear or branched, substituted or unsubstituted alkyl group of 1 to 20 carbon atoms, an aryl group of 6 to 20 carbon atoms, an aralkyl group of 7 to 20 carbon atoms, or an alkoxy group of 1 to 20 carbon atoms. Examples of linear or branched, substituted or unsubstituted alkyl groups of 1 to 20 carbon atoms include alkyl groups such as methyl, ethyl, propyl, isopropyl, butyl, isobutyl, tert-butyl, pentyl, neopentyl, hexyl and octyl groups; and halogen-substituted alkyl groups such as chloromethyl, chloropropyl, bromoethyl and trifluoropropyl groups. Examples of aryl groups of 6 to 20 carbon atoms include phenyl, tolyl, xylyl and naphthyl groups. Examples of aralkyl groups of 7 to 20 carbon atoms include benzyl, phenylethyl and phenylpropyl groups. Examples of alkoxy groups of 1 to 20 carbon atoms include methoxy, ethoxy and propoxy groups. R is preferably a linear or branched, substituted or unsubstituted alkyl group of 1 to 20 carbon atoms, or an aryl group of 6 to 20 carbon atoms. From the standpoint of versatility, a methyl group or a phenyl group is more preferred.

The subscript a is an integer of 2 to 4; the subscript b is an integer of 0 to 2; the subscript c is an integer of 50 to 1,000, preferably an integer of 100 to 800, and more preferably an integer of 200 to 600; the subscript d is 0 or 1; and the subscript e is 0 or 1.

L is a polyoxyalkylene group of above formula (2).

In formula (2), $R^1$ is a linear or branched, substituted or unsubstituted alkyl group of 1 to 10 carbon atoms, a hydrogen atom, a carboxyl group, an acyl group of 2 to 10 carbon atoms or a phenyl group. Examples of linear or branched, substituted or unsubstituted alkyl groups of 1 to 10 carbon atoms include alkyl groups such as methyl, ethyl, propyl, isopropyl, butyl, isobutyl, tert-butyl, pentyl, neopentyl, hexyl and octyl groups; and halogen-substituted alkyl groups such as chloromethyl, chloropropyl, bromoethyl and trifluoropropyl groups. Examples of acyl groups of 2 to 10 carbon atoms include acetyl and octanoyl groups. $R^1$ is preferably a linear or branched, substituted or unsubstituted alkyl group of 1 to 10 carbon atoms, or a hydrogen atom. In terms of the ease of synthesis, a hydrogen atom is more preferred.

EO represents an oxyethylene group, and AO represents a linear or branched oxyalkylene group of 3 to 10 carbon atoms. Examples of AO include oxypropylene, oxybutylene and oxytetramethylene groups.

As for the subscripts r, s and t, r is an integer from 0 to 10, s is an integer from 1 to 100, t is an integer from 0 to 150, and the sum s+t≥15. It is preferable for s to be an integer of 1 to 80 and t to be an integer from 0 to 100, and more preferable for s to be an integer from 3 to 50 and t to be an integer from 3 to 50. When s is larger than 100 or t is larger than 150, the polyoxyalkylene-modified organopolysiloxane compound (A) has too high a viscosity and becomes difficult to handle. The sum s+t in the average structural formula for one molecule is 15 or more, and preferably 25 or more. At less than 15, the solvent resistance of the organopolysiloxane emulsion composition formulated with the polyoxyalkylene-modified organopolysiloxane compound (A) decreases, and when the organopolysiloxane emulsion composition is dispersed in a polar solvent such as an alcohol or a ketone, the organopolysiloxane emulsion composition breaks down and the silicone ingredient separates out.

EO and AO may be in a block or random arrangement. The subscript r should satisfy the above-indicated value, although from the standpoint of versatility, it is most preferable for r to be 1.

The polyoxyalkylene group of formula (2) is exemplified by, but not limited to, groups of the following general formulas

[Chem. 6]

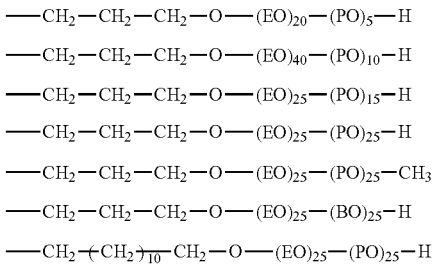

(wherein EO stands for ethylene oxide, PO stands for propylene oxide, and BO stands for butylene oxide).

Component (A) is preferably, of the polyoxyalkylene-modified organopolysiloxane compounds of above formula (1), a linear polyoxyalkylene-modified organopolysiloxane compound of general formula (3) below having polyoxyalkylene groups at both ends

[Chem. 7]

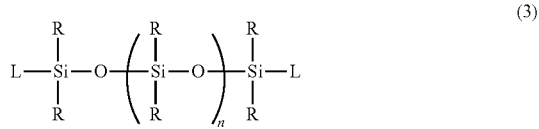
(3)

(wherein L and R are as defined above, and the subscript n is an integer from 50 to 1,000).

In formula (3), n is an integer from 50 to 1,000, preferably an integer from 100 to 800, and more preferably an integer from 200 to 600. When n is smaller than 50, the solvent resistance of the organopolysiloxane emulsion composition containing the polyoxyalkylene-modified organopolysiloxane compound (A) decreases and films of the organopolysiloxane emulsion composition-containing resin composition of the invention have decreased gloss. When n is larger than 1,000, the polyoxyalkylene-modified organopolysiloxane compound (A) has a higher viscosity and becomes difficult to handle. Also, the emulsifying power of the polyoxyalkylene-modified organopolysiloxane compound (A) decreases and so the emulsion within the organopolysiloxane emulsion composition of the invention does not achieve a small average particle size.

In cases where two or more types of polyoxyalkylene-modified organopolysiloxane compound (A) are mixed together, the average structural formula should satisfy the range specified above.

The polyoxyalkylene-modified organopolysiloxane compound serving as component (A) is exemplified by, but not limited to, compounds of the following formulas.

[Chem. 8]

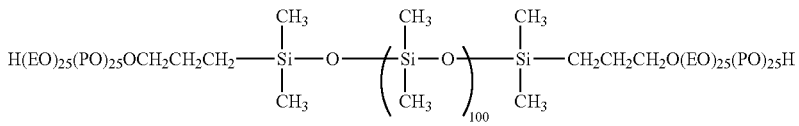

[Chem. 9]

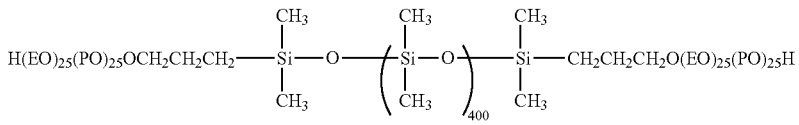

[Chem. 10]

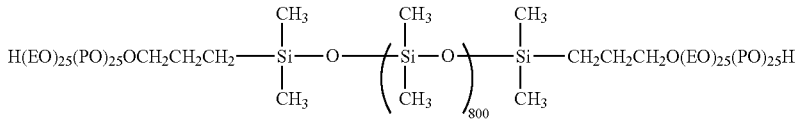

[Chem. 11]

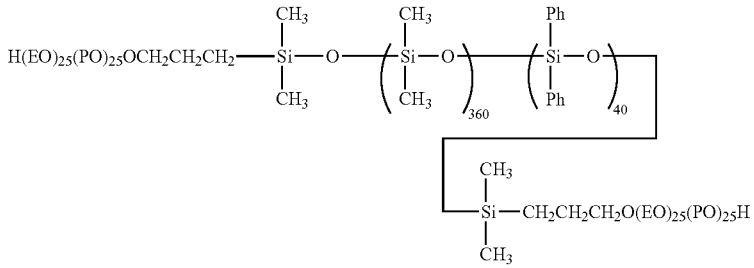

[Chem. 12]

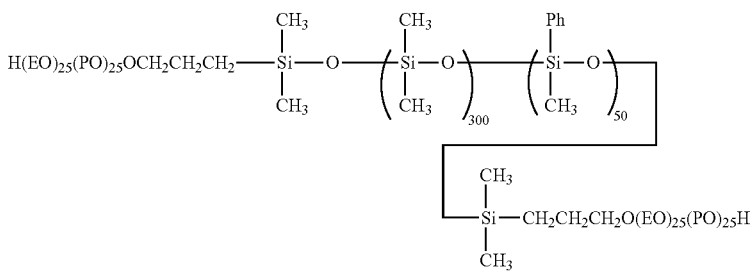

[Chem.13]

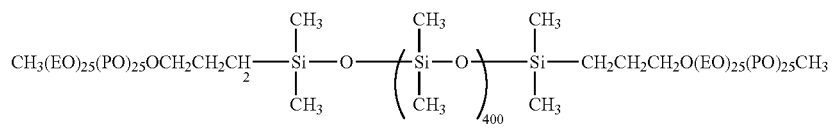

[Chem. 14]

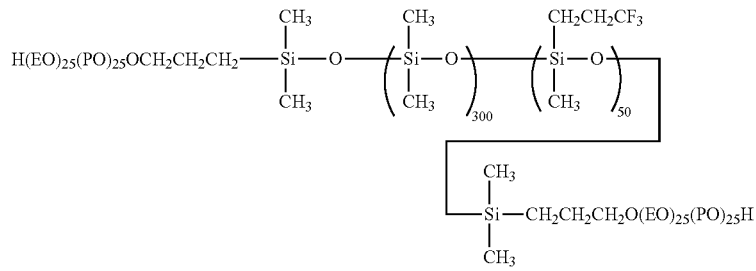

In the above formulas, Ph stands for a phenyl group, EO stands for ethylene oxide, and PO stands for propylene oxide. EO and PO may be in a block or random arrangement.

The polyoxyalkylene-modified organopolysiloxane compound (A) has a molecular weight of preferably from 8,500 to 100,000, more preferably from 10,000 to 90,000, and even more preferably from 15,000 to 90,000. At a molecular weight below 8,500, the solvent resistance of the organopolysiloxane emulsion composition containing polyoxyalkylene-modified organopolysiloxane compound (A) may decrease, whereas at more than 100,000, the viscosity is high and handling may be difficult. Here and below, the molecular weight is the polystyrene-equivalent weight-average molecular weight obtained by gel permeation chromatography (GPC) using the HLC 8220 system from to Tosoh Corporation and using tetrahydrofuran (THF) as the solvent.

The polyoxyalkylene-modified organopolysiloxane compound (A) has a viscosity of preferably at least 5,000 mPa·s, more preferably at least 9,000 mPa·s, and even more preferably at least 15,000 mPa·s. At a viscosity below 5,000 mPa·s, the solvent resistance of the organopolysiloxane emulsion composition containing the polyoxyalkylene-modified organopolysiloxane compound (A) may decrease and films of the organopolysiloxane emulsion composition-containing resin composition of the invention may have a decreased gloss. Here and below, the viscosity is a value measured at 25° C. using a BM- or BH-type rotational viscometer.

As shown in formula (1), molecules of the polyoxyalkylene-modified organopolysiloxane compound (A) may include not only $[R_2SiO_{2/2}]$ units, but also $[RSiO_{3/2}]$ units and $[SiO_{4/2}]$ units. By including $[RSiO_{3/2}]$ units and $[SiO_{4/2}]$ units within molecules of the polyoxyalkylene-modified organopolysiloxane compound (A), there is a possibility that films of the organopolysiloxane emulsion composition-containing resin composition of the invention will have improved wear resistance.

Preparation of the polyoxyalkylene-modified organopolysiloxane compound (A) may be carried out by a known method.

One example is the synthesis of a polyoxyalkylene-modified organopolysiloxane compound by the hydrosilylation of an unsaturated hydrocarbon group-containing polyoxyalkylene compound of general formula (5) below with a terminal silicon-bonded hydrogen atom-containing organo-polysiloxane compound of general formula (4) below in the presence of a hydrosilylation catalyst, either in a solvent or in the absence of a solvent.

<Terminal Silicon-Bonded Hydrogen Atom-Containing Organopolysiloxane Compound>

$$(HR_2SiO_{1/2})_a(R_3SiO_{1/2})_b(R_2SiO_{2/2})_c(RSiO_{3/2})_d(SiO_{4/2})_e \quad (4)$$

In this formula, R, a, b, c, d and e are as defined above.

<Unsaturated Hydrocarbon Group-Containing Polyoxyalkylene Compound>

[Chem. 15]

$$H_2C{=}CH_2{-}(CH_2)_r{-}O{-}(EO)_s{-}(AO)_t{-}R^1 \quad (5)$$

In this formula, EO, AO, $R^1$, r, s and t are as defined above.

In the terminal silicon-bonded hydrogen atom-containing organopolysiloxane compound, even in cases where two or more terminal silicon-bonded hydrogen atom-containing organopolysiloxane compounds are mixed together, the average structural formula should satisfy the range specified in formula (4).

It is possible to include not only $[R_2SiO_{2/2}]$ units, but also $[RSiO_{3/2}]$ units and $[SiO_{4/2}]$ units within molecules of the terminal silicon-bonded hydrogen atom-containing organopolysiloxane compound of formula (4). There is a possibility that, by including $[RSiO_{3/2}]$ units and $[SiO_{4/2}]$ units within molecules of the polyoxyalkylene-modified organopolysiloxane compound (A), the wear resistance of films of the organopolysiloxane emulsion composition-containing resin composition of the invention will be improved.

Among terminal silicon-bonded hydrogen atom-containing organopolysiloxane compounds of formula (4), linear organopolysiloxane compounds which contain silicon-bonded hydrogen atoms at both ends of general formula (6) below are preferred.

[Chem. 16]

(6)

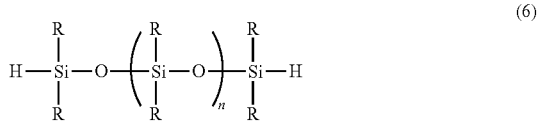

In this formula, R and n are as defined above.

The terminal silicon-bonded hydrogen atom-containing organopolysiloxane compound of formula (4) is exemplified by, but not limited to, those of the following formulas.

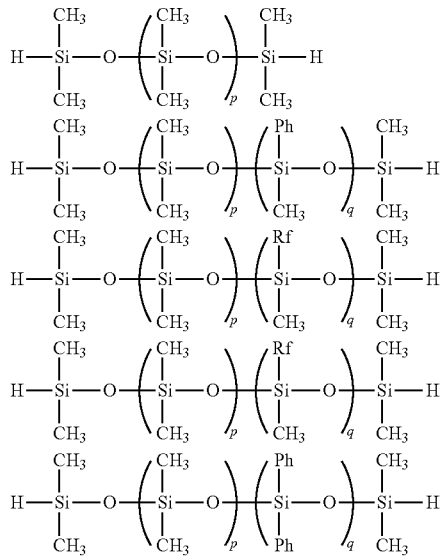

In these formulas, Ph stands for a phenyl group, Rf stands for a trifluoropropyl group, and the subscripts p and q are each integers of 0 or more, with the sum p+q being from 50 to 1,000.

In the unsaturated hydrocarbon group-containing polyoxyalkylene compound, it is also possible to use in admixture two or more types of unsaturated hydrocarbon group-containing polyoxyalkylene compounds that satisfy general formula (5). When mixing together two or more types of unsaturated hydrocarbon group-containing polyoxyalkylene compounds, the average structural formula of the mixed oils should satisfy the above-mentioned range of general formula (5).

The unsaturated hydrocarbon group-containing polyoxyalkylene compound of formula (5) is exemplified by, but not limited to, those of the following formulas.

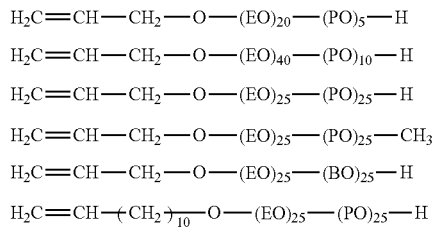

In these formulas, EO stands for ethylene oxide, PO stands for propylene oxide, and BO stands for butylene oxide. EO, PO and BO may be in random or block arrangements.

The number of moles of unsaturated hydrocarbon groups in the unsaturated hydrocarbon group-containing polyoxyalkylene compound of formula (5) is preferably at least 0.7 equivalent and less than 2.0 equivalents, and more preferably at least 1.0 equivalent and less than 2.0 equivalents, with respect to the number of moles of silicon-bonded hydrogen atoms on the terminal silicon-bonded hydrogen atom-containing organopolysiloxane compound of formula (4). At less than 0.7 equivalent, the hydrophilicity of the polyoxyalkylene-modified organopolysiloxane compound (A) decreases and there is a possibility that the compound will not function as an emulsifying agent or a co-emulsifying agent. At 2.0 equivalents or more, during preparation of the polyoxyalkylene-modified organopolysiloxane compound (A), a large amount of unsaturated hydrocarbon group-containing polyoxyalkylene compound of formula (5) remains unreacted and there is a possibility of this affecting the emulsifiability and other properties of the polyoxyalkylene-modified organopolysiloxane compound (A). In cases where the number of moles of silicon-bonded hydrogen atoms in formula (4) is larger than the number of moles of unsaturated hydrocarbon groups in formula (5) and hydrogen atoms remain following the hydrosilylation reaction, the amount of remaining silicon-bonded hydrogen atoms can be lowered by adding an olefin such as hexene or heptene and further carrying out hydrosilylation.

The hydrosilylation catalyst used in hydrosilylation is a catalyst for accelerating the hydrosilylation reaction. Exemplary catalysts include platinum catalysts, rhodium catalysts and palladium catalysts, with platinum catalysts being preferred. Examples of platinum catalysts include chloroplatinic acid, alcohol-modified chloroplatinic acid, olefin complexes of platinum, ketone complexes of platinum, vinylsiloxane complexes of platinum, platinum tetrachloride, finely powdered platinum, solid platinum loaded on an alumina or silica support, platinum black, olefin complexes of platinum, alkenylsiloxane complexes of platinum and carbonyl complexes of platinum. From the standpoint of stability and versatility, chloroplatinic acid or a vinylsiloxane complex of platinum is preferred. The catalyst content is not particularly limited so long as it is an effective amount, although the content is preferably such that the weight of catalyst metal is preferably in the range of 0.1 to 1,000 ppm, and more preferably in the range of 0.5 to 100 ppm, with respect to the combined weight of the terminal silicon-bonded hydrogen atom-containing organopolysiloxane compound and the unsaturated hydrocarbon group-containing polyoxyalkylene compound.

The solvent used in the hydrosilylation reaction is exemplified by aromatic hydrocarbon solvents such as toluene and xylene, hydrocarbon solvents such as hexane and octane, ether solvents such as dibutyl ether, dioxane and tetrahydrofuran (THF), ester solvents such as ethyl acetate and butyl acetate, ketone solvents such as methyl ethyl ketone (MEK), alcohol solvents such as ethanol, isopropanol and 1-butanol, and organic solvents such as chlorinated hydrocarbon solvents.

Relative to a combined amount of the terminal silicon-bonded hydrogen atom-containing organopolysiloxane compound and the unsaturated hydrocarbon group-containing polyoxyalkylene compound of 100 parts by weight, the solvent content is from 0 to 1,000 parts by weight. When a solvent is used, the solvent content is preferably at least 50 parts by weight. At a low solvent content, the hydrosilylation reaction may proceed slowly. On the other hand, at a high solvent content, solvent waste increases, causing environment contamination.

In cases where an alcohol solvent is used, it is preferable to use a pH adjustor such as potassium acetate in order to prevent or suppress the dehydrogenation reaction (JP-B S62-34039).

It is desirable for the reaction temperature of hydrosilylation to be in the range of 50 to 150° C. At a reaction temperature lower than 50° C., the reaction rate may decline. At a reaction temperature higher than 150° C., unsaturated hydrocarbons internally migrate and the hydrosilylation reaction may not proceed. The reaction time is preferably from 2 to 15 hours.

The hydrosilylation reaction when preparing the polyoxyalkylene-modified organopolysiloxane compound (A) is described in detail. In a nitrogen atmosphere, a terminal silicon-bonded hydrogen atom-containing organopolysiloxane compound, an unsaturated hydrocarbon group-containing polyoxyalkylene compound and isopropyl alcohol as the solvent are heated, bringing the internal temperature to 75° C. Next, a toluene solution of a vinylsiloxane complex of platinum is added and the system is stirred for 8 hours, thereby synthesizing the polyoxyalkylene-modified organopolysiloxane compound (A).

In addition, by heating and reducing the pressure, the isopropyl alcohol solvent can be driven off. At this time, at a temperature higher than 120° C., the alkyl ether sites may oxidize. It is thus desirable to carry out the reaction at below 120° C.

Also, in the above method, following hydrosilylation, deodorization by removing allyl ether groups with an acidic substance or by alkylation via a hydrogenation reaction may be carried out. Tocopherol or dibutylhydroxytoluene (BHT) may be added as an antioxidant to the polyoxyalkylene-modified organopolysiloxane compound (A) thus obtained.

There are cases in which the polyoxyalkylene-modified organopolysiloxane compound (A), depending on the structure, takes the form of a paste, gel or solid and does not have flowability. Generally, when preparing a polyoxyalkylene-modified organopolysiloxane compound (A) which does not have flowability, preparation in an organic solvent is preferable because the hydrosilylation reaction proceeds efficiently.

Also, if the polyoxyalkylene-modified organopolysiloxane compound (A) is in the form of a paste, gel or solid that lacks flowability, it may not effectively disperse during emulsification, making it impossible to emulsify the organopolysiloxane (C). At such times, use is made of: an organic solvent solution of the polyoxyalkylene-modified organopolysiloxane compound (A), a nonionic surfactant (B-1) solution of the polyoxyalkylene-modified organopolysiloxane compound (A), an aqueous solution of the polyoxyalkylene-modified organopolysiloxane compound (A), or a nonionic surfactant (B-1) solution of the polyoxyalkylene-modified organopolysiloxane compound (A) that has itself been dissolved in water.

An organic solvent that dissolves component (A) should be used in the organic solvent solution of the polyoxyalkylene-modified organopolysiloxane compound (A). The organic solvent used in preparing component (A) may be used directly for this purpose. The nonionic surfactant (B-1) solution (dissolved product) of the polyoxyalkylene-modified organopolysiloxane compound (A) may be prepared by adding the subsequently described nonionic surfactant (B-1) to the above organic solvent solution (dissolved product) of the polyoxyalkylene-modified organopolysiloxane compound (A) and carrying out heating and pressure reduction. When solvent displacing a solution (dissolved product) of the polyoxyalkylene-modified organopolysiloxane compound (A) with the nonionic surfactant (B-1), it is essential to select a nonionic surfactant which has a vapor pressure that is lower than the vapor pressure of the organic solvent so that only the organic solvent is driven off and the nonionic surfactant (B-1) is not driven off.

The method of preparing the nonionic surfactant (B-1) solution (dissolved product) of the polyoxyalkylene-modified organopolysiloxane compound (A) is as follows. The subsequently described nonionic surfactant (B-1) is added to an organic solvent solution of the polyoxyalkylene-modified organopolysiloxane compound (A), the pressure is reduced to from 3 to 50 mmHg and heating at from room temperature (20° C.) to 120° C. is carried out, thereby driving off the organic solvent and displacing it with the nonionic surfactant (B-1). The heating temperature at this time is preferably less than 120° C. At a temperature higher than 120° C., the alkyl ether sites may oxidize. In cases where foaming arises when the solvent is driven off, it is also possible to add a defoamer.

[(B) Surfactant]

The surfactant serving as component (B) is exemplified by nonionic surfactants, anionic surfactants, cationic surfactants and amphoteric surfactants.

Exemplary nonionic surfactants include polyoxyethylene alkyl ethers and other polyoxyalkylene alkyl ethers, polyoxyethylene polyoxypropylene alkyl ethers, polyoxyethylene alkyl phenyl ethers, polyoxyethylene fatty acid esters, sorbitan fatty acid esters, polyoxyethylene sorbitan fatty acid esters and glycerin fatty acid esters. Specific examples of these include polyoxyethylene octyl ether, polyoxyethylene polyoxypropylene octyl ether, polyoxyethylene nonyl ether, polyoxyethylene decyl ether, polyoxyethylene polyoxypropylene decyl ether, polyoxyethylene lauryl ether, polyoxyethylene polyoxypropylene lauryl ether, polyoxyethylene tridecyl ether, polyoxyethylene polyoxypropylene tridecyl ether and polyoxyethylene cetyl ether. The use of reactive surfactants having functional groups is also possible.

Exemplary anionic surfactants include alkyl sulfates such as lauryl sulfate, alkylbenzenesulfonic acids and salts thereof, sulfuric acid esters of monoalkyl polyoxyethylene ethers, acetic acid salts of monoalkyl polyoxyethylene ethers, alkylnaphthylsulfonic acids and salts thereof, alkali metal sulforesinates, alkali metal sulfosuccinates, alkylphosphoric acids and salts thereof, phosphoric acid esters of monoalkyl polyoxyethylene ethers, sulfonated glyceryl esters of fatty acids, alkali metal salts of alkyl sulfates and sulfuric acid esters. Specific examples of these include lauryl sulfuric acid, sodium lauryl sulfate, triethanolamine lauryl sulfate, ammonium lauryl sulfate, sodium lauryl polyoxyethylene ether sulfate, sodium lauryl polyoxyethylene ether acetate, sodium dodecylbenzenesulfonate, disodium lauryl polyoxyethylene sulfosuccinate, sodium dioctyl sulfosuccinate, sodium lauryl polyoxyethylene ether phosphate and sodium alkylnaphthalenesulfonate. The use of reactive surfactants having a functional group is also possible.

Exemplary cationic surfactants include alkylamines, quaternary ammonium salts, sulfonium salts, phosphonium salts and acetic acid salts. Specific examples include stearyl amine acetate, lauryltrimethylammonium chloride, cetyltrimethylammonium, stearyltrimethylammonium chloride and alkylbenzyldimethylammonium chloride.

Exemplary amphoteric surfactants include alkyl betaines and alkyl imidazolines. Specific examples of these include lauryldimethylaminoacetic acid betaine, lauryldimethylamine oxide and 2-alkyl-N-carboxymethyl-N-hydroxyethylimidazolinium betaine.

In the case of anionic surfactants, cationic surfactants and amphoteric surfactants, sometimes the uses are limited because the molecule bears a charge, and sometimes atoms such as sulfur or nitrogen included in the surfactant become catalyst poisons, hindering the reaction. In cases where the organopolysiloxane emulsion composition of the invention is formulated for uses in which the surfactant charge or catalyst poisoning is a concern, use should be made of only nonionic surfactants. From the standpoint of emulsifiability, the nonionic surfactant is preferably a polyoxyalkylene alkyl ether or a polyoxyethylene sorbitan fatty acid ester.

[(B-1) Nonionic Surfactant]

The nonionic surfactant is described in detail. Nonionic surfactants suitable for use in the present invention are nonionic surfactants which are liquid at 25° C. and which are capable of dissolving the polyoxyalkylene-modified organopolysiloxane compound (A). Examples include nonionic surfactants such as polyoxyethylene alkyl ether and other polyoxyalkylene alkyl ethers, polyoxyethylene polyoxypropylene alkyl ethers, polyoxyethylene alkyl phenyl ethers, polyoxyethylene fatty acid esters, sorbitan fatty acid esters, polyoxyethylene sorbitan fatty acid esters and glycerin fatty acid esters. Specific examples of these include polyoxyethylene octyl ether, polyoxyethylene polyoxypropylene octyl ether, polyoxyethylene nonyl ether, polyoxyethylene decyl ether, polyoxyethylene polyoxypropylene decyl ether, polyoxyethylene lauryl ether, polyoxyethylene polyoxypropylene lauryl ether, polyoxyethylene tridecyl ether, polyoxyethylene polyoxypropylene tridecyl ether and polyoxyethylene cetyl ether. Of these nonionic surfactants, from the standpoint of emulsifiability, a polyoxyalkylene alkyl ether or a polyoxyethylene sorbitan fatty acid ester is preferred. Of these, ones for which the number of added moles of ethylene oxide is from 2 to 14 and the hydrophilic-lipophilic balance (HLB) is from 7.5 to 15 are especially preferred. The HLB is determined by Griffin's method. Two or more nonionic surfactants may be mixed and used together, in which case the HLB of the mixed surfactants should satisfy the above value.

[(C) Organopolysiloxane]

The organopolysiloxane serving as component (C) is one having a viscosity at 25° C. of at least 15,000 mPa·s.

Examples of organopolysiloxane include cyclic siloxanes, methylhydrogenpolysiloxanes, dimethylpolysiloxanes, alkyl-modified polysiloxanes, aralkyl-modified polysiloxanes, vinyl-modified polysiloxanes, amino-modified polysiloxanes, amino acid-modified polysiloxanes, fluorine-modified polysiloxanes, epoxy-modified polysiloxanes, (meth) acryl-modified polysiloxanes, hydroxy-modified polysiloxanes and phenyl-modified polysiloxanes. From the standpoint of versatility, preferred examples include dimethylpolysiloxanes, hydroxy-modified polysiloxanes and phenyl-modified polysiloxanes.

The organopolysiloxane has a viscosity at 25° C. of at least 15,000 mPa·s, preferably from 500,000 to 100,000,000 mPa·s, and more preferably from 750,000 to 100,000,000 mPa·s. At a viscosity lower than 15,000 mPa·s, the slippage is low and the gloss of a film of the organopolysiloxane emulsion composition-containing resin composition of the invention may decrease. At a viscosity higher than 100,000,000 mPa·s, the strain on the equipment during emulsification may be heavy.

Two or more organopolysiloxanes may be mixed together and used as component (C), in which case the viscosity of the mixed organopolysiloxanes should satisfy the above range.

In the organopolysiloxane emulsion composition of the invention, the content of the polyoxyalkylene-modified organopolysiloxane compound (A) is from 1 to 50 parts by weight, preferably from 1 to 40 parts by weight, and more preferably from 3 to 35 parts by weight, per 100 parts by weight of the organopolysiloxane (C). At a polyoxyalkylene-modified organopolysiloxane compound (A) content below 1 part by weight, due to a decrease in emulsifiability, the organopolysiloxane (C) may not emulsify. Also, the solvent resistance and salt resistance of the organopolysiloxane emulsion composition may decrease. On the other hand, at a polyoxyalkylene-modified organopolysiloxane compound (A) content of more than 50 parts by weight, the transparency of the film of organopolysiloxane emulsion composition-containing resin composition may decrease.

In cases where the organopolysiloxane emulsion composition of the invention does not include water as component (D), component (C) disperses and emulsifies in components (A) and (B). In cases where the composition includes water as component (D), component (C) disperses and emulsifies only in component (D) and/or component (A) and/or component (B).

In the organopolysiloxane emulsion composition of the invention, the content of the surfactant (B) is from 0 to 50 parts by weight, preferably from 3 to 40 parts by weight, and more preferably from 5 to 35 parts by weight, per 100 parts by weight of the organopolysiloxane (C). In cases where the organopolysiloxane (C) can be emulsified with the polyoxyalkylene-modified organopolysiloxane compound (A) alone, a surfactant (B) need not be included. A surfactant (B) content of more than 50 parts by weight may impair the wear resistance of the film of the inventive resin composition.

When a surfactant (B) is used, the weight ratio between the polyoxyalkylene-modified organopolysiloxane compound (A) and the surfactant (B) is not specified, although it is desirable for the weight ratio (polyoxyalkylene-modified organopolysiloxane compound (A)/surfactant (B)) to be at least 0.1, preferably from 0.2 to 10.0, and more preferably from 0.5 to 5.0. When the polyoxyalkylene-modified organopolysiloxane compound (A) and the surfactant (B) are used as emulsifying agents or co-emulsifying agents for the organopolysiloxane (C), a ratio below 0.1 may lower the emulsifying strength with respect to the organopolysiloxane (C) and may lower the solvent resistance of the organopolysiloxane emulsion composition.

The combined amount of the polyoxyalkylene-modified organopolysiloxane compound (A) and the surfactant (B) is not particularly specified, although this is typically from 5 to 100 parts by weight, preferably from 10 to 75 parts by weight, and more preferably from 25 to 75 parts by weight, per 100 parts by weight of the organopolysiloxane (C). When the combined amount of the polyoxyalkylene-modified organopolysiloxane compound (A) and the surfactant (B) is less than 5 parts by weight per 100 parts by weight of the organopolysiloxane (C), it may not be possible to emulsify the organopolysiloxane (C) or the emulsion may be unstable. On the other hand, a combined amount in excess of 100 parts by weight by weight may impair the wear resistance of a film of the resulting resin composition.

[(D) Water]

In the organopolysiloxane emulsion composition of the invention, water (D) should be included where necessary from the standpoint of the required form of the manufactured article (e.g., self-emulsifying type, emulsion type), emulsifiability and the like. Therefore, the water (D) content, based on an organopolysiloxane (C) content of 100 parts by weight, is from 0 to 10,000 parts by weight, preferably from 0 to 5,000 parts by weight, and more preferably from 0 to 1,000 parts by weight. At more than 10,000 parts by weight, the stability may decrease and separation may become large. At a water (D) content within the above range, the particle size does not change over time. When emulsification of the organopolysiloxane (C) is possible with the polyoxyalkylene-modified organopolysiloxane compound (A) and the surfactant (B), there is no need to include water (D). When including an organopolysiloxane emulsion composition in a solvent-based resin composition in particular, if water is present within the organopolysiloxane emulsion composition, depending on the type of solvent, separation from the water may occur, preventing uniformity from being achieved. In such cases, it is preferable to use an organopolysiloxane emulsion composition that contains no water.

[Preparation of Composition]

Specific methods for emulsifying the organopolysiloxane emulsion composition of the invention are primarily as indicated below. A first method emulsifies a mixture of (A) the polyoxyalkylene-modified organopolysiloxane compound, (B) the surfactant and (C) the organopolysiloxane, and then blends in (D) water. A second method emulsifies a mixture of (A) the polyoxyalkylene-modified organopolysiloxane compound, (B) the surfactant, (C) the organopolysiloxane and (D) water. A third method emulsifies a mixture of (B) the surfactant, (C) the organopolysiloxane and (D) water, and then blends in (A) the polyoxyalkylene-modified organopolysiloxane compound. A fourth method emulsifies a mixture of (A) the polyoxyalkylene-modified organopolysiloxane compound, (C) the organopolysiloxane and (D) water, and then blends in (B) the surfactant. A fifth method emulsifies a mixture of (A) the polyoxyalkylene-modified organopolysiloxane compound and (C) the organopolysiloxane, and then blends in (B) the surfactant and (D) water. The emulsification methods of the invention are described in detail below.

The first emulsification method emulsifies a mixture of (A) the polyoxyalkylene-modified organopolysiloxane compound, (B) the surfactant and (C) the organopolysiloxane using a planetary mixer, which is a two- or three-blade mixer that operates based on orbital revolution and own-axis rotation. After 2 to 180 minutes of agitation until a given particle size is achieved, additional polyoxyalkylene-modified organopolysiloxane compound (A), surfactant (B) or water (D) is added as needed and dilution is carried out with a planetary mixer, a dispersion mixer (a mixer based on the rotation of toothed blades) or a homogenizing mixer (a mixer based on the spinning of a rotor within a stator), thereby preparing the organopolysiloxane emulsion composition.

The second emulsification method is as follows. A mixture of (A) the polyoxyalkylene-modified organopolysiloxane compound, (B) the surfactant, (C) the organopolysiloxane and (D) water is emulsified with a planetary mixer. After 2 to 180 minutes of agitation until a given particle size is achieved, additional (A) polyoxyalkylene-modified organopolysiloxane compound, (B) surfactant or (D) water is added as needed and dilution is carried out with a planetary mixer, a dispersion mixer or a homogenizing mixer, thereby preparing an organopolysiloxane emulsion composition.

The third emulsification method is as follows. A mixture of (B) the surfactant, (C) the organopolysiloxane and (D) water is emulsified with a planetary mixer or dispersion mixer. After 2 to 180 minutes of agitation until a given particle size is achieved, the polyoxyalkylene-modified organopolysiloxane compound (A) and, as needed, surfactant (B) or water (D) is blended in and mixing is carried out with a planetary mixer, a dispersion mixer or a homogenizing mixer, thereby preparing an organopolysiloxane emulsion composition.

The fourth emulsification method is as follows. A mixture of (A) the polyoxyalkylene-modified organopolysiloxane compound, (C) the organopolysiloxane and (D) water is emulsified with a planetary mixer or a dispersion mixer. After 2 to 180 minutes of agitation until a given particle size is achieved, additional polyoxyalkylene-modified organopolysiloxane compound (A), surfactant (B) or water (D) is added as needed and dilution is carried out with a planetary mixer, a dispersion mixer or a homogenizing mixer, thereby preparing an organopolysiloxane emulsion composition.

The fifth emulsification method is as follows. A mixture of (A) the polyoxyalkylene-modified organopolysiloxane compound and (C) the organopolysiloxane is emulsified with a planetary mixer or a dispersion mixer. After 2 to 180 minutes of agitation until a given particle size is achieved, additional polyoxyalkylene-modified organopolysiloxane compound (A), surfactant (B) or water (D) is added as needed and dilution is carried out with a planetary mixer, a dispersion mixer or a homogenizing mixer, thereby preparing an organopolysiloxane emulsion composition.

The concentration of the organopolysiloxane (C) in the organopolysiloxane emulsion composition of the invention is preferably in the range of 1 to 90 wt %. At less than 1 wt %, the stability of the emulsion composition becomes a problem; at more than 90 wt %, the viscosity of the emulsion is high, making the composition difficult to handle. Also, depending on the makeup of the organopolysiloxane emulsion composition, separation may occur over time. In such cases, separation can sometimes be suppressed by reducing the content of water included in the organopolysiloxane emulsion composition.

The temperature during emulsification is preferably from 0 to 80° C., and more preferably from 0 to 40° C. At a temperature below 0° C. or a temperature higher than 80° C., there is a possibility that emulsion will not take place or that the emulsion produced will become unstable. Emulsification may be carried out not only at normal pressure, but even under reduced pressure or applied pressure. When emulsion is carried out at reduced pressure or under applied pressure, bubbles are less likely to be entrained and effective emulsification is sometimes possible. To avoid vaporization of the starting materials, care must be taken so that the pressure during pressure reduction is higher than the vapor pressure of the starting materials.

With regard to the emulsifier used during emulsification, it is necessary to select one which is capable of agitating the starting materials or the emulsion composition. Effective emulsification is possible by using, as a planetary mixer—which is a two- or three-blade mixer that operates based on orbital revolution and own-axis rotation, any of the following: the Gate Mixer (Inoue Manufacturing, Inc.), the Hivis Mix® (Primix Corporation), or the Hivis Disper Mix model 3D-5 (Primix Corporation), which is an agitator based on the orbital revolution and own-axis rotation of two blades and the high-speed rotation of a toothed blade. Alternatively, use can be made of a colloid mill having an agitating mechanism consisting of a rotor and a stator (such as those available from IKA, PUC, Nissei Corporation and Iwaki Co., Ltd.), and high-shear mixers (such as those available from Silverson and Primix Corporation). Use can also be made of the Homogenizing Disper (Primix Corporation), the Agi Homo Mixer (Primix Corporation), the Combi Mix® (Primix Corporation)—which is a three-shaft dispersion mixer that combines the Homogenizing Mixer, the Homogenizing Disper and the Anchor Mixer, the twin-screw mixer HAAKE MiniLab II (Thermo Scientific)—which has co-rotating screws or counter-rotating screws, and the MC 15 and MC 5 (Rheo Lab Ltd.). In cases where the three-shaft dispersion mixer Combi Mix® (Primix Corporation) or the Hivis Disper Mix (Primix Corporation) is used, emulsification with the Anchor Mixer alone is also possible.

Aside from the surfactant, the organopolysiloxane emulsion composition of the invention may also be formulated with, as a protective colloid or a thickener, a water-soluble polymer such as polyvinyl alcohol, methylcellulose, carboxymethylcellulose, hydroxymethylcellulose, polyvinylpyrrolidone, alginic acid salt, xanthan gum or an acrylic acid polymer. In addition, antimicrobial agents or preservatives such as oxazoline compounds and aromatic carboxylic acid salts, as well as fragrances, antioxidants, corrosion inhibitors, dyes, fillers, curing catalysts, organic powders and inorganic powders may be included.

The average particle size of the emulsion of the inventive organopolysiloxane emulsion composition, although not here specified, is typically not more than 20 µm, preferably not more than 10 µm, and more preferably not more than 5 µm. At an average particle size larger than 20 µm, in cases where the organopolysiloxane emulsion composition has been dispersed in water or a solvent such as dimethylformamide, separation sometimes occurs immediately. In the organopolysiloxane emulsion composition of the invention, when the average particle size of the emulsion is 1.5 µm or more, it can be measured using the Multisizer 3 from Beckman Coulter. When the emulsion has an average particle size of less than 1.5 µm, measurement may be carried out with the LA920 or LA960 from Horiba, Ltd. or with the N4 PLUS from Beckman Coulter. The average particle size, although it has no particular lower limit, is typically at least 0.1 µm, and preferably at least 0.5 µm.

[Resin Composition]

The organopolysiloxane emulsion composition of this invention may be used as a surface treatment agent or an internally added treatment agent for synthetic leather and artificial leather. By blending the organopolysiloxane emulsion composition in a resin composition composed primarily of an acrylic resin or a urethane resin, good slippage can be imparted.

Examples of the resin used in this resin composition include thermoset resins such as urethane resins, epoxy resins, phenolic resins, melamine resins, urea resins, alkyd resins and polyimide resins; and thermoplastic resins such as polyethylene, polypropylene, polyvinyl chloride, polystyrene, polyvinyl acetate, tetrafluoroethylene, acrylonitrile-butadiene-styrene resins, acrylonitrile-styrene resins and acrylic resins. From the standpoint of versatility, a urethane resin or an acrylic resin is preferred.

When blending the organopolysiloxane emulsion composition into a resin composition, the organopolysiloxane emulsion composition may be blended directly into the resin composition and uniformly dispersed, or it may first be dispersed in water or a solvent such as DMF or MEK and then blended into the resin composition. To uniformly mix the organopolysiloxane emulsion composition into the resin composition, use can be made of a known mixer, such as a homogenizing mixer, a Satake mixer, a static mixer, a Ross mixer, a Hobart mixer, a Henschel mixer, a paddle mixer or a ribbon mixer.

The amount of organopolysiloxane emulsion composition included in the resin composition is from 0.01 to 30 wt %, preferable from 0.1 to 20 wt %, and more preferably from 0.2 to 10 wt %, based on the resin solids. At a content of less than 0.01 wt %, slippage sometimes cannot be obtained. At a content of more than 30 wt %, the gloss and the leveling ability sometimes decrease.

Film-forming methods in which the resin composition of the invention is applied as a surface treatment agent to the surface of artificial leather or synthetic leather are exemplified by spraying methods that involve direct spraying, and direct coating methods with a gravure coater, a knife coater, a comma coater or an air-knife coater. From the standpoint of versatility and the stability of the resin composition, a direct coating method using a gravure coater is most preferred. With regard to the coating weight, the weight of the applied film after drying is preferably in the range of 3 to 100 $g/m^2$, and more preferably in the range of 5 to 30 $g/m^2$. At a film weight below 3 $g/m^2$ or above 100 $g/m^2$, a uniform resin layer does not readily form and unevenness in the gloss and the leveling ability may arise.

The drying conditions following application of the resin composition of the invention are not particularly limited, provided that the water or solvent within the resin composition evaporates and, where necessary, resin crosslinking reactions. Generally, heating at from 20 to 150° C. for a period of from about 10 seconds to about 5 minutes is preferred, and heating at from 80 to 130° C. for a period of from about 30 seconds to about 2 minutes is more preferred.

Methods of producing artificial leather in which the resin composition of the invention is included as an internally added treatment agent are exemplified as follows. The artificial leather is produced by applying the resin composition of the invention and various types of polymer compounds to a nonwoven sheet composed primarily of ultrafine fibers as the artificial leather starting material, and heating, drying and the like. Application to the nonwoven sheet may be carried out by any suitable method, such as impregnation, spraying or coating. Heating and drying methods are exemplified by hot air drying, infrared heating and radio-frequency heating. Taking into account equipment investment costs, ease of maintenance and the like, hot-air dryers are commonly used. The drying temperature is from 20 to 150° C. With heating at temperatures higher than 150° C., a decrease in the heat resistance of the resins and fiber deterioration become concerns.

In this invention, by having a polyoxyalkylene-modified organopolysiloxane compound of a specific structure serve as an emulsifying agent or a co-emulsifying agent, a highly polymerized organopolysiloxane can be emulsified and it is possible to blend this organopolysiloxane emulsion composition in both solvent-based and water-based resin compositions and also to impart good slippage. Accordingly, the resin composition of the invention is useful as a surface treatment agent or an internally added treatment agent for synthetic leather and artificial leather intended for use in automobile seats, bags and the like.

EXAMPLES

The invention is illustrated more fully below by way of Examples and Comparative Examples. However, the invention is not limited by these Examples. In the Examples below, viscosity is a value measured at 25° C. using a BM- or BH-type rotational viscometer. Also, the weight-average molecular weight is the polystyrene-equivalent weight-average molecular weight obtained by gel permeation chromatography (GPC) with the HLC 8220 system from Tosoh Corporation and using tetrahydrofuran (THF) as the solvent.

Example 1

Under a nitrogen atmosphere, 85 parts by weight (85 g) of a silicon-bonded hydrogen atom-containing organopolysiloxane of general formula (6a) below

[Chem. 19]

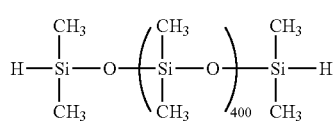

(6a)

(viscosity, 2,800 mm²/s; amount of hydrogen atoms bonded to silicon atoms, 0.006 mol/100 g), 15 parts by weight (15 g) of an unsaturated group-containing polyoxyalkylene compound of general formula (5a) below

[Chem. 20]

$$H_2C=CH-CH_2-O-(CH_2CH_2O)_{25}-(CH_2CHCH_3O)_{25}-H \quad (5a),$$

and 250 parts by weight (250 g) of isopropyl alcohol were added together and then heated, bringing the internal temperature to 75° C. Next, a toluene solution of a vinylsiloxane complex of platinum was added in an amount of 5 ppm weight of platinum metal with respect to the siloxane and the system was stirred for 8 hours, thereby synthesizing Polyoxyalkylene-Modified Organopolysiloxane Compound A of general formula (7) below (weight-average molecular weight by GPC, 50,000) at a rate of conversion of at least 90% (Polyoxyalkylene-Modified Organopolysiloxane Compound A is a 29 wt % isopropanol solution). The molar ratio between unsaturated hydrocarbon group of the compound of formula (5a and silicon-bonded hydrogen atom of the compound of formula (6a) is (5a)/(6a)=1.1.

[Chem. 21]

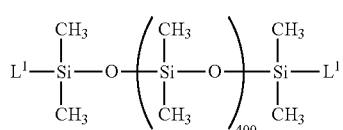

(7)

$L^1 = C_3H_6O(CH_2CH_2O)_{25}(CH_2CHCH_3O)_{25}H$

The Surfactant-Dissolved Polyoxyalkylene-Modified Organopolysiloxane Compound A-1 was obtained by adding 60 parts by weight (60 g) of the nonionic surfactant TERGITOL-TMN6 (from Dow Chemical; a 90 wt % aqueous solution of polyoxyethylene alkyl ether; HLB, 13.1) to 350 parts by weight (350 g) of Polyoxyalkylene-Modified Organopolysiloxane Compound A (29 wt % isopropanol solution), and driving off under reduced pressure (10 to 15 mmHg, 35 to 40° C.) the isopropyl alcohol and the water included in the nonionic surfactant TERGITOL-TMN6.

Next, 35 parts by weight (35 g) of a hydroxydimethyl-terminated polysiloxane at both end of general formula (8) below (viscosity, 7,000,000 mPa·s)

[Chem. 22]

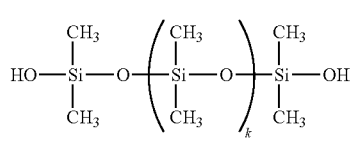

(8)

(wherein k is a number that provides the indicated viscosity) and 15 parts by weight (15 g) of the Surfactant-Dissolved Polyoxyalkylene-Modified Organopolysiloxane Compound A-1 obtained above were stirred for about 120 minutes at 20 to 30 rpm in a Hivis Mix (Primix Corporation), thereby giving Emulsion Composition A. Upon measurement with the LA920 (Horiba, Ltd.), the average particle size was found to be 0.7 μm.

Example 2

Emulsion Composition B was obtained by stirring the following for 120 minutes at 20 to 30 rpm in a Hivis Mix (Primix Corporation): 35 parts by weight (35 g) of a hydroxydimethyl-terminated polysiloxane at both end of general formula (9) below (viscosity, 30,000,000 mPa·s)

[Chem. 23]

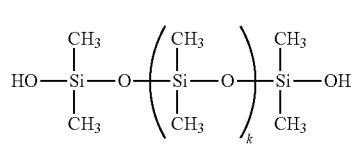

(9)

(wherein k is a number that provides the indicated viscosity) and 15 parts by weight (15 g) of Surfactant-Dissolved Polyoxyalkylene-Modified Organopolysiloxane Compound A-1 obtained in Example 1. Upon measurement with the LA920 (Horiba, Ltd.), the average particle size was found to be 0.9 μm.

Example 3

Fifty parts by weight (50 g) of the nonionic surfactant Sannonic SS120 (Sanyo Chemical Industries, Ltd.; a polyoxyethylene alkyl ether; HLB, 14.5) was added to 350 parts by weight (350 g) of Polyoxyalkylene-Modified Organopolysiloxane Compound A of general formula (7) (29 wt % isopropanol solution; weight-average molecular weight by GPC, 50,000) obtained in Example 1, and the isopropyl alcohol was driven off under reduced pressure (10 to 15 mmHg, 35 to 40° C.), giving Surfactant-Dissolved Polyoxyalkylene-Modified Organopolysiloxane Compound A-2.

Next, 35 parts by weight (35 g) of a hydroxydimethyl-terminated polysiloxane at both end of general formula (9) above (viscosity, 30,000,000 mPa·s) and 15 parts by weight (15 g) of the Surfactant-Dissolved Polyoxyalkylene-Modified Organopolysiloxane Compound A-2 obtained above were stirred for about 60 minutes at 20 rpm in a Hivis Mix (Primix Corporation), thereby giving Emulsion Composition C. Upon measurement with the Multisizer 3 (Beckman Coulter), the average particle size was found to be 4.9 μm.

Example 4

Under a nitrogen atmosphere, 41 parts by weight (41 g) of a silicon-bonded hydrogen atom-containing organopolysiloxane of general formula (6b) below

[Chem. 24]

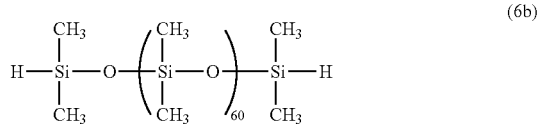

(6b)

(viscosity, 75 mm$^2$/s; amount of hydrogen atoms bonded to silicon atoms, 0.05 mol/100 g), 59 parts by weight (59 g) of an unsaturated group-containing polyoxyalkylene compound of general formula (5a) above, and 250 parts by weight (250 g) of isopropyl alcohol were added together and then heated, bringing the internal temperature to 75° C. Next, a toluene solution of a vinylsiloxane complex of platinum was added in an amount of 5 ppm weight of platinum metal with respect to the siloxane and the system was stirred for 8 hours, thereby synthesizing Polyoxyalkylene-Modified Organopolysiloxane Compound B of general formula (10) below (weight-average molecular weight by GPC, 14,000) at a rate of conversion of at least 90% (Polyoxyalkylene-Modified Organopolysiloxane Compound B is a 29 wt % isopropanol solution). The molar ratio between unsaturated hydrocarbon group of the compound of formula (5a) and silicon-bonded hydrogen atom of the compound of formula (6b) is (5a)/(6b)=1.1.

[Chem. 25]

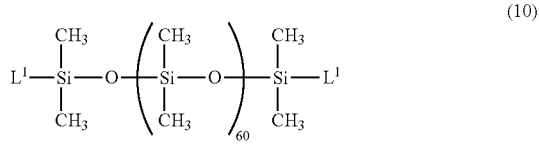

(10)

L$^1$ = C$_3$H$_6$O(CH$_2$CH$_2$O)$_{25}$(CH$_2$CHCH$_3$O)$_{25}$H

The Surfactant-Dissolved Polyoxyalkylene-Modified Organopolysiloxane Compound B was obtained by adding 60 parts by weight (60 g) of the nonionic surfactant TERGITOL-TMN6 (from Dow Chemical; a 90 wt % aqueous solution of polyoxyethylene alkyl ether; HLB, 13.1) to 350 parts by weight (350 g) of Polyoxyalkylene-Modified Organopolysiloxane Compound B (29 wt % isopropanol solution), and driving off under reduced pressure (10 to 15 mmHg, 35 to 40° C.) the isopropyl alcohol and the water included in the nonionic surfactant TERGITOL-TMN6.

Next, 35 parts by weight (35 g) of the hydroxydimethyl-terminated polysiloxane at both end of general formula (8) above (viscosity, 7,000,000 mPa·s) and 15 parts by weight (15 g) of the Surfactant-Dissolved Polyoxyalkylene-Modified Organopolysiloxane Compound B obtained above were stirred for about 120 minutes at 20 to 30 rpm in a Hivis Mix (Primix Corporation), thereby giving Emulsion Composition D. Upon measurement with the LA920 (Horiba, Ltd.), the average particle size was found to be 0.7 μm.

Example 5

Under a nitrogen atmosphere, 84 parts by weight (84 g) of a silicon-bonded hydrogen atom-containing organopolysiloxane of general formula (6a) above (viscosity, 2,800 mm$^2$/s; amount of hydrogen atoms bonded to silicon atoms, 0.006 mol/100 g), 16 parts by weight (16 g) of an unsaturated group-containing polyoxyalkylene compound of general formula (5b) below

[Chem. 26]

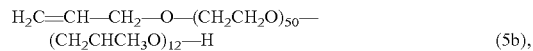

H$_2$C=CH—CH$_2$—O—(CH$_2$CH$_2$O)$_{50}$—(CH$_2$CHCH$_3$O)$_{12}$—H    (5b), and 250 parts by weight (250 g) of isopropyl alcohol were added together and then heated, bringing the internal temperature to 75° C. Next, a toluene solution of a vinylsiloxane complex of platinum was added in an amount of 5 ppm weight of platinum metal with respect to the siloxane and the system was stirred for 8 hours, thereby synthesizing Polyoxyalkylene-Modified Organopolysiloxane Compound C of general formula (11) below (weight-average molecular weight by GPC, 50,000) at a rate of conversion of at least 90% (Polyoxyalkylene-Modified Organopolysiloxane Compound C is a 29 wt % isopropanol solution). The molar ratio between unsaturated hydrocarbon group of the compound of formula (5bb and silicon-bonded hydrogen atom of the compound of formula (a) is (5b)/(6a)=1.1.

[Chem. 27]

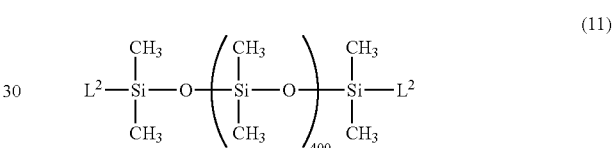

(11)

L$^2$ = C$_3$H$_6$O(CH$_2$CH$_2$O)$_{50}$(CH$_2$CHCH$_3$O)$_{12}$H

The Surfactant-Dissolved Polyoxyalkylene-Modified Organopolysiloxane Compound C was obtained by adding 60 parts by weight (60 g) of the nonionic surfactant TERGITOL-TMN6 (from Dow Chemical; a 90 wt % aqueous solution of polyoxyethylene alkyl ether; HLB, 13.1) to 350 parts by weight (350 g) of Polyoxyalkylene-Modified Organopolysiloxane Compound C (29 wt % isopropanol solution), and driving off under reduced pressure (10 to 15 mmHg, 35 to 40° C.) the isopropyl alcohol and the water to included in the nonionic surfactant TERGITOL-TMN6.

Next, 35 parts by weight (35 g) of the hydroxydimethyl-terminated polysiloxane at both end of general formula (9) above (viscosity, 30,000,000 mPa·s) and 15 parts by weight (15 g) of the Surfactant-Dissolved Polyoxyalkylene-Modified Organopolysiloxane Compound C obtained above were stirred for about 90 minutes at 20 to 30 rpm in a Hivis Mix (Primix Corporation), thereby giving Emulsion Composition E. Upon measurement with the Multisizer 3 (Beckman Coulter), the average particle size was found to be 5.6 μm.

Example 6

Emulsion Composition F was obtained by stirring the following for 90 minutes at 20 to 30 rpm in a Hivis Mix (Primix Corporation): 35 parts by weight (35 g) of the hydroxydimethyl-terminated polysiloxane at both end of general formula (9) above (viscosity, 30,000,000 mPa·s) and 15 parts by weight (15 g) of Surfactant-Dissolved Polyoxyalkylene-Modified Organopolysiloxane Compound C obtained in Example 5. Upon measurement with the Multisizer 3 (Beckman Coulter), the average particle size was found to be 5.2 μm.

Example 7

Emulsion Composition G was obtained by stirring the following for 90 minutes at 20 to 30 rpm in a Hivis Mix (Primix Corporation): 35 parts by weight (35 g) of the hydroxydimethyl-terminated polysiloxane at both end of general formula (9) above (viscosity, 30,000,000 mPa·s) and 15 parts by weight (15 g) of Surfactant-Dissolved Polyoxyalkylene-Modified Organopolysiloxane Compound C obtained in Example 5, and then adding 5 parts by weight (5 g) of water and stirring for 3 minutes at 500 rpm in a Homogenizing Disper (Primix Corporation). Upon measurement with the Multisizer 3 (Beckman Coulter), the average particle size was found to be 5.7 μm.

Example 8

Under a nitrogen atmosphere, 54 parts by weight (54 g) of a silicon-bonded hydrogen atom-containing organopolysiloxane of general formula (6b) above (viscosity, 75 mm$^2$/s; amount of hydrogen atoms bonded to silicon atoms, 0.05 mol/100 g), 46 parts by weight (46 g) of an unsaturated group-containing polyoxyalkylene compound of general formula (5c) below

[Chem. 28]

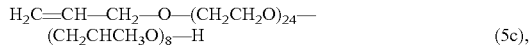

$$H_2C=CH-CH_2-O-(CH_2CH_2O)_{24}-(CH_2CHCH_3O)_8-H \quad (5c),$$

and 100 parts by weight (100 g) of isopropyl alcohol were added together and then heated, bringing the internal temperature to 75° C. Next, a toluene solution of a vinylsiloxane complex of platinum was added in an amount of 5 ppm weight of platinum metal with respect to the siloxane and the system was stirred for 8 hours, thereby synthesizing Polyoxyalkylene-Modified Organopolysiloxane Compound D of general formula (12) below (weight-average molecular weight by GPC, 10,000) at a rate of conversion of at least 90% (Polyoxyalkylene-Modified Organopolysiloxane Compound D is a 50 wt % isopropanol solution). The molar ratio between unsaturated hydrocarbon group of the compound of formula (5c) and silicon-bonded hydrogen atom of the compound of formula 6b) is (5c)/(6b)=1.1.

The isopropyl alcohol was driven off under reduced pressure at 10 to 15 mmHg and 35 to 40° C., giving Polyoxyalkylene-Modified Organopolysiloxane Compound D-1. The viscosity of Polyoxyalkylene-Modified Organopolysiloxane Compound D-1 was 80,000 mPa·s.

[Chem. 29]

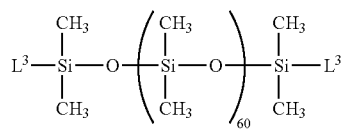

(12)

$L^3 = C_3H_6O(CH_2CH_2O)_{24}(CH_2CHCH_3O)_8H$

Emulsion Composition H was obtained by stirring the following for 30 minutes at 20 rpm in a Hivis Mix (Primix Corporation): 35 parts by weight (35 g) of the hydroxydimethyl-terminated polysiloxane at both end (viscosity, 7,000,000 mPa·s) of general formula (8) above, 14 parts by weight (15 g) of Polyoxyalkylene-Modified Organopolysiloxane Compound D-1 obtained above, and 1 part by weight (1 g) of Sannonic SS70 (Sanyo Chemical Industries, Ltd.; a polyoxyethylene alkyl ether; HLB, 12.1). Upon measurement with the LA920 (Horiba, Ltd.), the average particle size was found to be 0.9 μm.

Example 9

The silicon-bonded hydrogen atom-containing organopolysiloxane of general formula (6a) above (viscosity, 2,800 mm$^2$/s; amount of hydrogen atoms bonded to silicon atoms, 0.006 mol/100 g) in an amount of 87 parts by weight (87 g), 13 parts by weight (13 g) of an unsaturated group-containing polyoxyalkylene compound of general formula (5d) below

[Chem. 30]

$$H_2C=CH-(CH_2)_4-O-(CH_2CH_2O)_{25}-(CH_2CHCH_3O)_{25}-H \quad (5d),$$

and 250 parts by weight (250 g) of isopropyl alcohol were added together and then heated, bringing the internal temperature to 75° C. Next, a toluene solution of a vinylsiloxane complex of platinum was added in an amount of 5 ppm weight of platinum metal with respect to the siloxane and the system was stirred for 8 hours, thereby synthesizing Polyoxyalkylene-Modified Organopolysiloxane Compound E of general formula (13) below (weight-average molecular weight by GPC, 50,000) at a rate of conversion of at least 90% (Polyoxyalkylene-Modified Organopolysiloxane Compound E is a 29 wt % isopropanol solution). The molar ratio between unsaturated hydrocarbon group of the compound of formula (5d) and silicon-bonded hydrogen atom of the compound of formula (6a) is (5d)/(6a)=1.1.

The Surfactant-Dissolved Polyoxyalkylene-Modified Organopolysiloxane Compound E-1 was obtained by adding 60 parts by weight (60 g) of the nonionic surfactant TERGITOL-TMN6 (from Dow Chemical; a 90 wt % aqueous solution of polyoxyethylene alkyl ether; HLB, 13.1) to 350 parts by weight (350 g) of Polyoxyalkylene-Modified Organopolysiloxane Compound E (29 wt % isopropanol solution), and driving off under reduced pressure (10 to 15 mmHg, 35 to 40° C.) the isopropyl alcohol and the water included in the nonionic surfactant TERGITOL-TMN6.

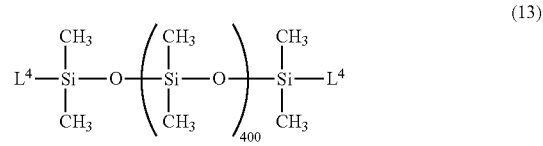

(13)

$L^4 = C_6H_{12}O(CH_2CH_2O)_{25}(CH_2CHCH_3O)_{25}H$

Next, 35 parts by weight (35 g) of the hydroxydimethyl-terminated polysiloxane at both end of general formula (8) above (viscosity, 7,000,000 mPa·s) and 15 parts by weight (15 g) of the Surfactant-Dissolved Polyoxyalkylene-Modified Organopolysiloxane Compound E-1 obtained above were stirred for about 120 minutes at 20 to 30 rpm in a Hivis Mix (Primix Corporation), thereby giving Emulsion Composition I. Upon measurement with the LA920 (Horiba, Ltd.), the average particle size was found to be 0.9 μm.

Comparative Example 1

Under a nitrogen atmosphere, 55 parts by weight (55 g) of the silicon-bonded hydrogen atom-containing organopolysiloxane of general formula (6b) above (viscosity, 75 mm$^2$/s;

amount of hydrogen atoms bonded to silicon atoms, 0.05 mol/100 g), 45 parts by weight (45 g) of an unsaturated group-containing polyoxyalkylene compound of general formula (5e) below

[Chem. 31]

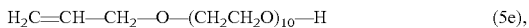

$H_2C=CH-CH_2-O-(CH_2CH_2O)_{10}-H$ (5e), and 100 parts by weight (100 g) of isopropyl alcohol were added together and then heated, bringing the internal temperature to 75° C. Next, a toluene solution of a vinylsiloxane complex of platinum was added in an amount of 5 ppm weight of platinum metal with respect to the siloxane and the system was stirred for 8 hours, thereby synthesizing Polyoxyalkylene-Modified Organopolysiloxane Compound F of general formula (14) below (Polyoxyalkylene-Modified Organopolysiloxane Compound F is a 50 wt % isopropanol solution). The molar ratio between unsaturated hydrocarbon group of the compound of formula (5e) and silicon-bonded hydrogen atom of the compound of formula (6b) is (5e)/(6b)=1.1.

The isopropanol was driven off under reduced pressure at 30 mmHg or below and 110 to 120° C. under nitrogen bubbling, thereby giving Polyoxyalkylene-Modified Organopolysiloxane Compound F-1 (weight-average molecular weight by GPC, 8,000). The viscosity of Polyoxyalkylene-Modified Organopolysiloxane Compound F-1 was 1,800 mPa·s.

[Chem. 32]

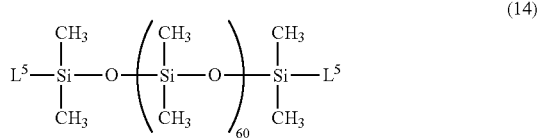

(14)

$L^5 = C_3H_6O(CH_2CH_2O)_{10}H$

Next, 10 parts by weight (10 g) of Polyoxyalkylene-Modified Organopolysiloxane Compound F-1 obtained above, 5.5 parts by weight (5.5 g) of the nonionic surfactant TERGITOL-TMN6 (Dow Chemical; a 90 wt % aqueous solution of polyoxyethylene alkyl ether; HLB, 13.1), and 35 parts by weight (35 g) of the hydroxydimethyl-terminated polysiloxane at both end of general formula (8) above (viscosity, 7,000,000 mPa·s) were stirred for about 60 minutes at 30 to 40 rpm in a Hivis Mix (Primix Corporation), but emulsification did not occur.

Comparative Example 2

Under a nitrogen atmosphere, 70 parts by weight (70 g) of the silicon-bonded hydrogen atom-containing organopolysiloxane of general formula (6c) below

[Chem. 33]

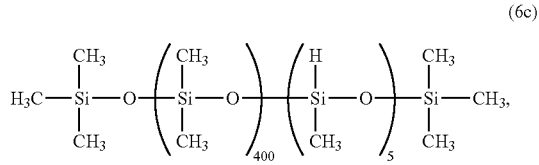

(6c)

30 parts by weight (30 g) of an unsaturated group-containing polyoxyalkylene compound of general formula (5a) above and 250 parts by weight (250 g) of isopropyl alcohol were heated, bringing the internal temperature to 75° C. Next, a toluene solution of a vinylsiloxane complex of platinum was added in an amount of 5 ppm weight of platinum metal with respect to the siloxane and the system was stirred for 8 hours, thereby synthesizing Polyoxyalkylene-Modified Organopolysiloxane Compound G of general formula (15) below having a weight-average molecular weight by GPC of 53,000 (Polyoxyalkylene-Modified Organopolysiloxane Compound G is a 29 wt % isopropanol solution). The molar ratio between unsaturated hydrocarbon group of the compound of formula (5a) and silicon-bonded hydrogen atom of the compound of formula (6c) is (5a)/(6c)=1.1.

[Chem. 34]

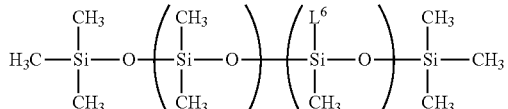

(15)

$L^6 = C_3H_6O(CH_2CH_2O)_{25}(CH_2CHCH_3)_{25}H$

The Surfactant-Dissolved Polyoxyalkylene-Modified Organopolysiloxane Compound G-1 was obtained by adding 60 parts by weight (60 g) of the nonionic surfactant TERGITOL-TMN6 (Dow Chemical; a 90 wt % aqueous solution of polyoxyethylene alkyl ether; HLB, 13.1) to 350 parts by weight (350 g) of Polyoxyalkylene-Modified Organopolysiloxane Compound G (29 wt % isopropanol solution) and then, under nitrogen bubbling, driving off under reduced pressure (10 to 15 mmHg, 30 to 45° C.) the isopropanol and the water included in the nonionic surfactant TERGITOL-TMN6.

Next, 15 parts by weight (15 g) of the Surfactant-Dissolved Polyoxyalkylene-Modified Organopolysiloxane Compound G-1 obtained above and 35 parts by weight (35 g) of the hydroxydimethyl-terminated polysiloxane at both end (viscosity, 7,000,000 mPa·s) of general formula (8) above were stirred for about 60 minutes at 40 to 50 rpm in a Hivis Mix (Primix Corporation), but the hydroxydimethyl-terminated polysiloxane at both end did not emulsify.

Comparative Example 3

Emulsion Composition J was obtained by stirring the following for about 60 minutes at 30 to 40 rpm in a Hivis Mix (Primix Corporation): 10 parts by weight (10 g) of the Polyoxyalkylene-Modified Organopolysiloxane Compound F-1 of general formula (14) above obtained in Comparative Example 1, 5.5 parts by weight (5.5 g) of the nonionic surfactant TERGITOL-TMN6 (Dow Chemical; a 90 wt % aqueous solution of polyoxyethylene alkyl ether; HLB, 13.1), 35 parts by weight (35 g) of the hydroxydimethyl-terminated polysiloxane at both end of general formula (8) above (viscosity, 7,000,000 mPa·s) and 5 parts by weight (5 g) of deionized water. Upon measurement with the Multisizer 3 (Beckman Coulter), the average particle size was found to be 1.7 μm.

Comparative Example 4

Emulsion Composition K was obtained by stirring the following for about 60 minutes at 30 to 40 rpm in a Hivis Mix (Primix Corporation): 5.5 parts by weight (5.5 g) of the nonionic surfactant TERGITOL-TMN6 (Dow Chemical; a 90 wt % aqueous solution of polyoxyethylene alkyl ether; HLB, 13.1), 35 parts by weight (35 g) of the hydroxydimethyl-terminated polysiloxane at both end of general formula (8) above (viscosity, 7,000,000 mPa·s) and 5 parts by weight (5 g) of deionized water. Upon measurement with the Multisizer 3 (Beckman Coulter), the average particle size was found to be 13.5 μm.

Comparative Example 5

The following were stirred for about 60 minutes at 30 to 40 rpm in a Hivis Mix (Primix Corporation): 5.5 parts by weight (5.5 g) of the nonionic surfactant TERGITOL-TMN6 (Dow Chemical; a 90 wt % aqueous solution of polyoxyethylene alkyl ether; HLB, 13.1), 35 parts by weight (35 g) of the hydroxydimethyl-terminated polysiloxane at both end of general formula (9) above (viscosity, 30,000,000 mPa·s) and 5 parts by weight (5 g) of deionized water. However, emulsification did not occur.

The following evaluations of emulsifiability, solvent resistance and slippage were carried out for each of the above Examples and Comparative Examples. The results are shown in Tables 1 to 3.

Emulsifiability:

The emulsifiability of the hydroxydimethyl-terminated polysiloxane at both ends in Examples 1 to 9 and Comparative Examples 1 to 5 was rated according to the following criteria after placing 0.5 g of the sample and 9.5 g of deionized water in a glass bottle, shaking the bottle and examining the appearance of the contents.

○: Sample is able to disperse in water
x: Sample in unable to disperse in water

Solvent Resistance:

Solvent resistance tests were carried out on Organopolysiloxane Emulsion Compositions A to K.

In the respective tests, Emulsion Compositions A to K in amounts of 0.5 g were placed together with 9.5 g of dimethylformamide (DMF) in a glass bottle, the bottle was shaken and the state of the solution was examined. The solvent resistance was rated according to the following criteria.

○: The emulsion composition dispersed in DMF with substantially no separation of the organopolysiloxane
Δ: Some of the organopolysiloxane separated out and some of the emulsion composition dispersed in the DMF
x: The DMF broke down the emulsion composition and the organopolysiloxane separated out Slippage 1:

Slippage Test 1 was carried out on Organopolysiloxane Emulsion Compositions A to K.

Emulsion Compositions A to K were diluted in water so as to form 20 wt % aqueous solutions. Next, 10 g of aqueous acrylic resin (40-418EF, from DIC Corporation) and 0.25 g of 20 wt % aqueous solutions of Emulsion Compositions A to K were placed in glass bottles and uniformly mixed by shaking. The emulsion composition-containing water-based acrylic resins were applied with a No. 3 wire bar onto paperboard (PA2831, from BYK) and dried at room temperature (25° C.) for one hour. The slippage was checked by rubbing the coated surface of the paperboard with a finger and rated according to the criteria shown below.

Slippage 2:

Slippage Test 2 was carried out on Organopolysiloxane Emulsion Compositions A to K.

Emulsion Compositions A to K were diluted with DMF so as to form 20 wt % DMF solutions. In those cases where, during the dilution of Emulsion Compositions A to K in DMF, the emulsion composition broke down and a large amount of silicone separation was observed, Slippage Test 2 was not carried out. Ten grams of a DMF solvent-based polyurethane resin (Sanprene LQ-258, from Sanyo Chemical Industries, Ltd.) and 0.25 g of Emulsion Compositions A to K were placed in a glass bottle and uniformly mixed by shaking. The emulsion composition-containing solvent-based polyurethane resin was applied with a No. 3 wire bar onto paperboard (PA2831, from BYK) and dried at room temperature (25° C.) for one hour. The slippage was checked by rubbing the coated surface of the paperboard with a finger and rated according to the criteria shown below.

○: The slippage was better than when Emulsion Composition A to K was not included
Δ: The slippage was the same as when Emulsion Composition A to K was not included
x: The slippage was inferior to when Emulsion Composition A to K was not included, or the organopolysiloxane within the resin separated out

TABLE 1

|  | Entry | | | | |
| --- | --- | --- | --- | --- | --- |
|  | Example 1 | Example 2 | Example 3 | Example 4 | Example 5 |
| Emulsion composition | A | B | C | D | E |
| Emulsifiability | ○ | ○ | ○ | ○ | ○ |
| Solvent resistance | ○ | ○ | ○ | ○ | ○ |
| Slippage 1 | ○ | ○ | ○ | ○ | ○ |
| Slippage 2 | ○ | ○ | ○ | ○ | ○ |

TABLE 2

|  | Entry | | | |
| --- | --- | --- | --- | --- |
|  | Example 6 | Example 7 | Example 8 | Example 9 |
| Emulsion composition | F | G | H | I |
| Emulsifiability | ○ | ○ | ○ | ○ |
| Solvent resistance | ○ | ○ | ○ | ○ |
| Slippage 1 | ○ | ○ | ○ | ○ |
| Slippage 2 | ○ | ○ | ○ | ○ |

TABLE 3

|  | Entry | | | | |
| --- | --- | --- | --- | --- | --- |
|  | Comparative Example 1 | Comparative Example 2 | Comparative Example 3 | Comparative Example 4 | Comparative Example 5 |
| Emulsion composition | — | — | J | K | — |
| Emulsifiability | x | x | ○ | ○ | x |

TABLE 3-continued

| | Entry | | | | |
|---|---|---|---|---|---|
| | Comparative Example 1 | Comparative Example 2 | Comparative Example 3 | Comparative Example 4 | Comparative Example 5 |
| Solvent resistance | — | — | Δ | x | — |
| Slippage 1 | — | — | ○ | ○ | — |
| Slippage 2 | — | — | x | x | — |

The invention claimed is:

1. An organopolysiloxane oil-in-water emulsion composition comprising:
   (A) from 1 to 50 parts by weight of a polyoxyalkylene-modified organopolysiloxane compound of general formula (1) below

[Chem. 1]

$$(LR_2SiO_{1/2})_a(R_3SiO_{1/2})_b(R_2SiO_{2/2})_c(RSiO_{3/2})_d(SiO_{4/2})_e \quad (1)$$

[wherein L is a polyoxyalkylene group of general formula (2) below

[Chem. 2]

$$-H_2C-CH_2-(CH_2)_r-O-(EO)_s-(AO)_t-R^1 \quad (2)$$

(EO representing an oxyethylene group, AO representing a linear or branched oxyalkylene group of 3 to 10 carbon atoms, $R^1$ being a linear or branched, substituted or unsubstituted alkyl group of 1 to 10 carbon atoms, a hydrogen atom, a carboxyl group, an acyl group of 2 to 10 carbon atoms or a phenyl group; the subscript r being an integer from 0 to 10, the subscript s being an integer from 1 to 100, the subscript t being an integer from 0 to 150, and the sum s+t being 15 or more); each R, which may be the same or different, is a hydrogen atom, a hydroxyl group, a linear or branched, substituted or unsubstituted alkyl group of 1 to 20 carbon atoms, an aryl group of 6 to 20 carbon atoms, an aralkyl group of 7 to 20 carbon atoms or an alkoxy group of 1 to 20 carbon atoms; the subscript a is an integer from 2 to 4; the subscript b is an integer from 0 to 2; the subscript c is an integer from 50 to 1,000; the subscript d is 0 or 1; and the subscript e is 0 or 1];
   (B) from 0 to 50 parts by weight of a surfactant;
   (C) 100 parts by weight of an organopolysiloxane having a viscosity at 25° C. of at least 15,000 mPa·s; and
   (D) from 0 to 10,000 parts by weight of water.

2. The organopolysiloxane oil-in-water emulsion composition of claim 1, wherein the polyoxyalkylene-modified organopolysiloxane compound (A) is a polyoxyalkylene-modified organopolysiloxane compound having a polyoxyalkylene group of general formula (3) below on both ends

[Chem. 3]

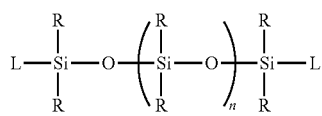

(wherein L and R are as defined above, and the subscript n is an integer from 50 to 1,000).

3. The organopolysiloxane oil-in-water emulsion composition of claim 1, wherein the organopolysiloxane (C) has a viscosity at 25° C. of at least 500,000 mPa·s.

4. The organopolysiloxane oil-in-water emulsion composition of claim 1, wherein the emulsion has an average particle size of not more than 20 mm.

5. The organopolysiloxane oil-in-water emulsion composition of claim 1, wherein the organopolysiloxane (C) is a dimethylpolysiloxane, a phenyl-modified polysiloxane, a hydroxy-modified polysiloxane, or a mixture of these.

6. A resin composition comprising a resin selected from the group consisting of urethane resins, epoxy resins, phenolic resins, melamine resins, urea resins, alkyd resins, polyimide resins, polyethylene, polypropylene, polyvinyl chloride, polystyrene, polyvinyl acetate, tetrafluoroethylene, acrylonitrile-butadiene-styrene resins, acrylonitrile-styrene resins and acrylic resins; and the organopolysiloxane oil-in-water emulsion composition of claim 1.

7. The organopolysiloxane oil-in-water emulsion composition of claim 1, wherein R is a linear or branched, substituted or unsubstituted alkyl group of 1 to 20 carbon atoms, or an aryl group of 6 to 20 carbon atoms.

8. The organopolysiloxane oil-in-water emulsion composition of claim 1, wherein the polyoxyalkylene-modified organopolysiloxane compound (A) is a polyoxyalkylene-modified organopolysiloxane compound having a polyoxyalkylene group of general formula (3) below on both ends

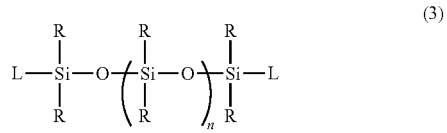

(wherein L and R are as defined above, and the subscript n is an integer from 200 to 1,000).

9. The organopolysiloxane oil-in-water emulsion composition of claim 8, wherein R is a linear or branched, substituted or unsubstituted alkyl group of 1 to 20 carbon atoms, or an aryl group of 6 to 20 carbon atoms.

10. An organopolysiloxane oil-in-solvent emulsion composition comprising:
   (A) from 1 to 50 parts by weight of a polyoxyalkylene-modified organopolysiloxane compound of general formula (1) below

[Chem. 1]

$$(LR_2SiO_{1/2})_a(R_3SiO_{1/2})_b(R_2SiO_{2/2})_c(RSiO_{3/2})_d(SiO_{4/2})_e \quad (1)$$

[wherein L is a polyoxyalkylene group of general formula (2) below

[Chem. 2]

$$-H_2C-CH_2-(CH_2)_r-O-(EO)_s-(AO)_t-R^1 \quad (2)$$

(EO representing an oxyethylene group, AO representing a linear or branched oxyalkylene group of 3 to 10 carbon atoms, $R^1$ being a linear or branched, substituted or unsubstituted alkyl group of 1 to 10 carbon atoms, a hydrogen atom, a carboxyl group, an acyl group of 2 to 10 carbon atoms or a phenyl group; the subscript r being an integer from 0 to 10, the subscript s being an integer from 1 to 100, the subscript t being an integer from 0 to 150, and the sum s+t being 15 or more); each R, which may be the same or different, is a hydrogen atom, a hydroxyl group, a linear or branched, substituted or unsubstituted alkyl group of 1 to 20 carbon atoms, an aryl group of 6 to 20 carbon atoms, an aralkyl group of 7 to 20 carbon atoms or an alkoxy group of 1 to 20 carbon atoms; the subscript a is an integer from 2 to 4; the subscript b is an integer from 0 to 2; the subscript c is an integer from 50 to 1,000; the subscript d is 0 or 1; and the subscript e is 0 or 1];

(B) from 0 to 50 parts by weight of a surfactant;
(C) 100 parts by weight of an organopolysiloxane having a viscosity at 25° C. of at least 15,000 mPa·s; and
(D) from 0 to 10,000 parts by weight of water.

11. The organopolysiloxane oil-in-solvent emulsion composition of claim 10, wherein the polyoxyalkylene-modified organopolysiloxane compound (A) is a polyoxyalkylene-modified organopolysiloxane compound having a polyoxyalkylene group of general formula (3) below on both ends

[Chem. 3]

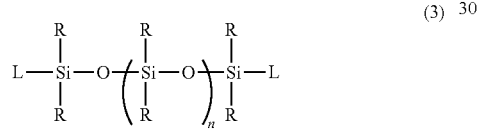

(3)

(wherein L and R are as defined above, and the subscript n is an integer from 50 to 1,000).

12. The organopolysiloxane oil-in-solvent emulsion composition of claim 10, wherein the organopolysiloxane (C) has a viscosity at 25° C. of at least 500,000 mPa·s.

13. The organopolysiloxane oil-in-solvent emulsion composition of claim 10, wherein the emulsion has an average particle size of not more than 20 mm.

14. The organopolysiloxane oil-in-solvent emulsion composition of claim 10, wherein the organopolysiloxane (C) is a dimethylpolysiloxane, a phenyl-modified polysiloxane, a hydroxy-modified polysiloxane, or a mixture of these.

15. A resin composition comprising a resin selected from the group consisting of urethane resins, epoxy resins, phenolic resins, melamine resins, urea resins, alkyd resins, polyimide resins, polyethylene, polypropylene, polyvinyl chloride, polystyrene, polyvinyl acetate, tetrafluoroethylene, acrylonitrile-butadiene-styrene resins, acrylonitrile-styrene resins and acrylic resins; and the organopolysiloxane oil-in-solvent emulsion composition of claim 10.

16. The organopolysiloxane oil-in-solvent emulsion composition of claim 10, wherein R is a linear or branched, substituted or unsubstituted alkyl group of 1 to 20 carbon atoms, or an aryl group of 6 to 20 carbon atoms.

17. The organopolysiloxane oil-in-solvent emulsion composition of claim 10, wherein the polyoxyalkylene-modified organopolysiloxane compound (A) is a polyoxyalkylene-modified organopolysiloxane compound having a polyoxyalkylene group of general formula (3) below on both ends

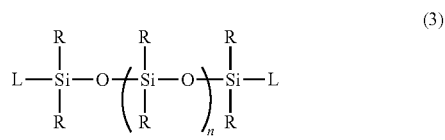

(3)

(wherein L and R are as defined above, and the subscript n is an integer from 200 to 1,000).

18. The organopolysiloxane oil-in-solvent emulsion composition of claim 17, wherein R is a linear or branched, substituted or unsubstituted alkyl group of 1 to 20 carbon atoms, or an aryl group of 6 to 20 carbon atoms.

* * * * *